United States Patent [19]

Lechevalier

[11] Patent Number: 5,548,959
[45] Date of Patent: Aug. 27, 1996

[54] ADJUSTMENT VALVE FOR INJECTING FUEL FOR A TURBOJET ENGINE

[75] Inventor: Michel M. A. A. Lechevalier, Mormant, France

[73] Assignee: Societe Nationale D'Etude et de Construction de Moteurs D'Aviation "SNECMA", Paris, France

[21] Appl. No.: 413,175

[22] Filed: Mar. 29, 1995

[30]    Foreign Application Priority Data

Apr. 1, 1994 [FR] France .................. 94 03871

[51] Int. Cl.⁶ .................................. F02C 7/232
[52] U.S. Cl. ............................... 60/734; 137/332
[58] Field of Search .............. 60/734, 740, 741, 60/744, 745; 137/331, 332; 251/56, 296

[56]           References Cited

U.S. PATENT DOCUMENTS 2,731,983  1/1956  Lee ................................ 137/331
3,550,373  12/1970  Bloom ............................ 137/331
5,020,315  6/1991  Leachman, Jr. et al. .
5,234,014  8/1993  Queitzsch ....................... 137/331

FOREIGN PATENT DOCUMENTS 442271   10/1973  Australia .
0457148  11/1991  European Pat. Off. .
1038055  5/1953   France .
1578076  8/1969   France .

Primary Examiner—Louis J. Casaregola
Attorney, Agent, or Firm—Oblon, Spivak, McClelland, Maier & Neustadt, P.C.

[57]            ABSTRACT

An adjustment valve is provided with a system able to prevent its piston from jamming. This piston (30) is fitted with a vane wheel (50) placed at its end and receiving a flow of air under pressure. The piston is thus in constant rotation inside the body (20) of the valve. Application is for the injection of fuels in turbojet engines.

5 Claims, 3 Drawing Sheets

ADJUSTMENT VALVE FOR INJECTING FUEL FOR A TURBOJET ENGINE

FIELD OF THE INVENTION

1. Background of the Invention

The invention concerns the control of fuel injected for a turbo-engine, such as a turbojet engine.

2. Discussion of the Background

The system for injecting fuel to a turbo-engine, such as a turbojet engine, is inserted between the fuel source and injectors placed upstream of the turbo-jet machine combustion chamber. Generally speaking, this sort of system includes connection means to connect the fuel source to the injectors of the turbo-jet machine. These means are constituted by a pump, a fuel filter, a stop valve, a heat exchanger and means for controlling the flow of fuel sent to the injectors. It also includes an electronic computer acting on these control means so as to adjust the flow of injected fuel according to the flight and operational parameters of the turbojet engine.

This system for injecting and dosing fuel is shown on FIG. 1. The fuel derived from a source (not shown) passes firstly through a low pressure pump 1 and through a main filter 2. It is then injected by a high pressure pump to a control valve 4. This control valve is controlled by a hydraulic or electro-hydraulic actuating circuit 5. It sends the excess fuel to the main filter 2 by means of a return pipe 6.

The fuel to be injected is thus sent by the control valve 4 to a doser 7 whose distributing piston 7A is placed in a suitable position under the action of an electronic computer 8 by means of actuators acting on both sides of the piston 7A of the doser 7, as shown by the arrows 9 and 10. The fuel to be injected is then propelled into a first injection pipe 11 so as to finally arrive in a stop valve 12. This stop valve is also controlled by the electronic computer 8 with the aid of an actuator 13. This stop valve 12 thus allows the fuel to be injected to move towards the exchanger 15 opening through an injection pipe 14 in the injectors (not shown) of the turbojet engine.

The excess flow of fuel recycled by the return pipe 6 in the filter 2 may be quite considerable and even much more than the consumed flow, especially in the case of flying at high altitudes. This additional flow moves again into the high pressure pump 3 and rises in pressure. Should the piston 4A of the control valve 4 become locked in a position approaching the closing position, this relatively large flow is unable to pass through. Furthermore, the pressure level of the fuel continues to increase, as a pressure detector, which controls the position of the piston 4A of the control valve 4, raises the level of the modulated pressure for the adjustment valve to the highest level. This phenomenon makes the pressure act more strongly on the piston 4A of the control valve which unseats it and places it in the opening position of the circuit. This operating anomaly is thus one which is extremely difficult to accept.

Generally speaking, in a system for injecting and dosing fuel for a turbojet engine, the jamming of a piston of a control valve is a factor to be avoided.

SUMMARY OF INVENTION

To this effect, the main object of the invention concerns a control valve for injecting fuel for a turbo-machine, the valve including:

a hollow body including at least one fuel intake where high pressure exists and at least one fuel outlet where low presure exists;

a piston mounted sliding in the body having a specific axis and including at least one surface cavity whose length is greater than the distance separating the inlet and outlet so as to place them in communication in a specific position of the piston;

means for translation-activating the piston, and means for rotating the piston so as to avoid the latter jamming and embodied in the form of a vane wheel centered and placed at one end of the piston opposite the end where the surface cavity is located integral with the latter and driven by a high pressure flow derived from a pipe in communication with the high pressure of the turbo-engine.

According to the invention, it includes a diaphragm placed on the pipe from where the high pressure arrives so as to adjust the speed of rotation of the vane wheel.

The surface cavity is preferably embodied in the form of several lenticular apertures.

In the preferential embodiment, the body includes two internal cavities, the first in which the fuel intake opens into, and the second in which the fuel outlet opens into.

The control means preferably include:

one end face of the piston on the side of the surface cavity in contact with the high pressure;

one outer radial face of a shoulder of the piston receiving the low pressure, and one internal radial face of the piston receiving the control pressure.

A spring is added to the valve by being placed in the body so as to keep the piston in a closed position below a certain specific control pressure.

BRIEF DESCRIPTION OF THE DRAWINGS

The invention and its various technical characteristics shall be more readily understood from a reading of the description of one embodiment of the invention with reference to four accompanying figures listed as follows.

DETAILED DESCRIPTION OF THE PREFERRED EMBODIMENT

Figure 2:
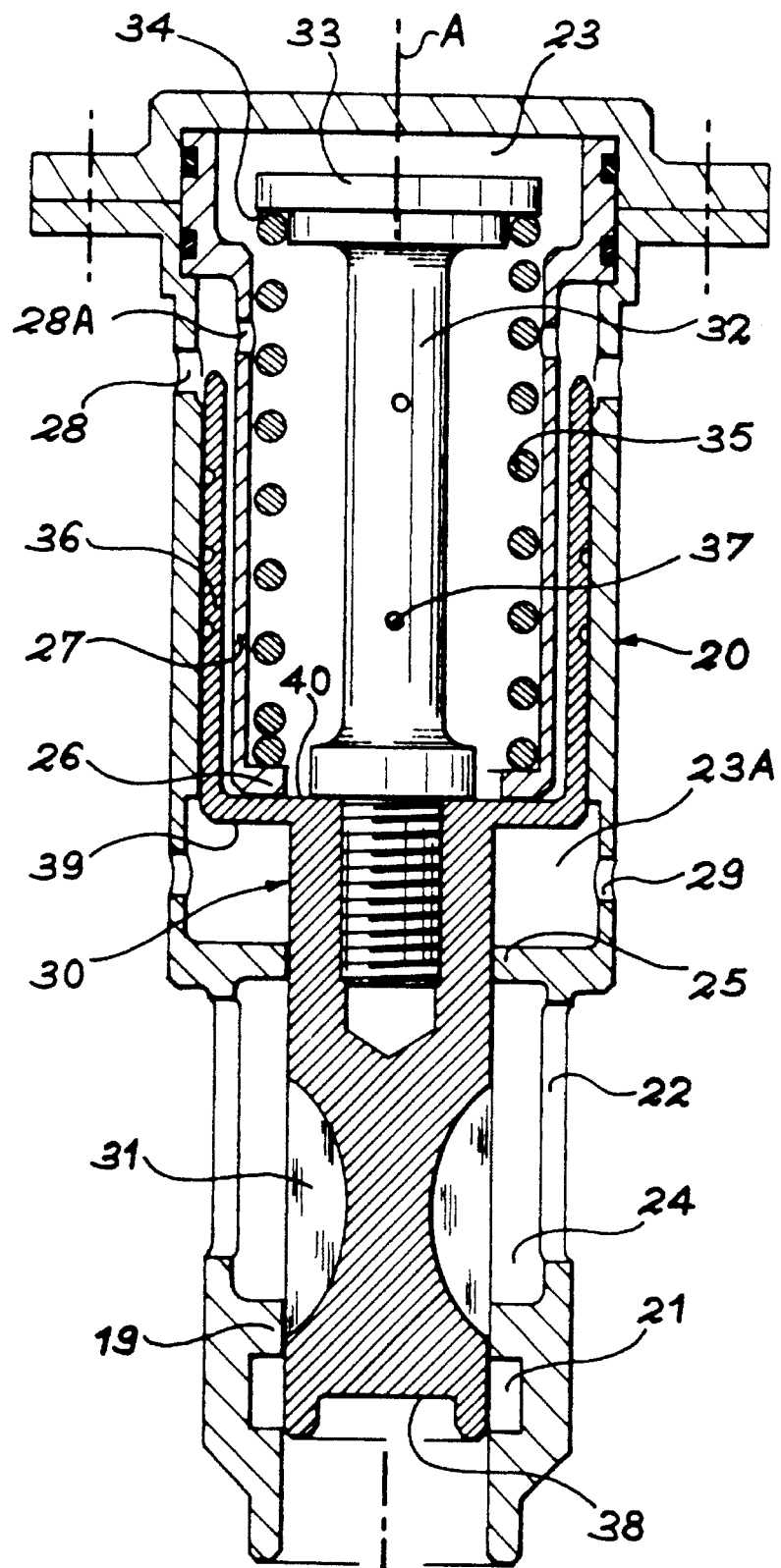
FIG. 2 is a sectional view of a valve according to the prior art.

With reference to FIG. 2, the valve includes a cylindrical body 20 having two internal cavities 23 and 24. In addition, it has a high pressure fuel intake 21 and a low pressure fuel outlet 22, both opening into the second cavity 24.

A piston 30 having a longitudinal axis slides inside this body 20. It slides in the first relatively wide internal cavity 23 of the body 20 and in the narrower second internal cavity of this same body 20. Between these two cavities is a first separation wall 25 whose diameter is even narrower and in which the piston 30 also slides and which seals off the two cavities.

The high pressure fuel intake 21 opens into the second internal cavity 24, whereas the low pressure fuel outlet 22 opens lower into the body 20.

However, the piston has several surface cavities 31, embodied in this instance in the form of lenticular apertures. The length of these apertures is slightly larger than the thickness of the second separation wall 19 separating the fuel inlet 21 and fuel outlet 22, in fact the second cavity 24.

In this way, when the piston is placed so that its lenticular apertures 31 are astride on the second separation wall 19, the fuel intake 21 and the fuel outlet 22 are in direct contact with each other.

In the embodiment described, the piston 30 is completed by a rod 32 axially screwed inside the piston and ended by a head 33. A spring 35 takes support on the internal surface 34 of this head and also takes support on an internal shoulder 26 of a bush 27 integral with the body 20. In fact, this bush 27 is placed inside the body 20. The hollow end 36 of the piston 30 slides between these two concentric elements. The purpose of the spring 35 is to keep the piston in a position where the lenticular apertures 31 are not in contact with the high pressure fuel intake.

Holes 37 are made through the rod 32 of the piston 30 so as to ensure that this rod does not form a closed chamber which would oppose movement of the piston.

Moreover, the body 20 includes in the first cavity 23 an inlet 28 of the modulated pressure of the valve so that this pressure exists around the rod 32 of the piston 20. If required, passage holes 28A are made in the bush 27. The body 20 also has in its first cavity 23 orifices 29 placing the other portion 23A of this first internal cavity placed around the piston at a low pressure, for example atmospheric pressure.

Thus, the piston 30 is subjected to three hydraulic forces. The first force is that of the high pressure by means of the fuel intake 21. This pressure acts on the end surface 38 of the piston 30.

The second force is a variable force undergone by one external radial surface 39 of the piston 30 at the base of the hollow portion 36. This second force is due to the low pressure originating from the orifices 29.

The third force is due to the reference modulated pressure which acts on the internal radial surface 40 of the piston 30 inside its hollow portion 36. It is therefore this radial internal surface 40 which is subjected to the valve control pressure.

FIG. 2 shows the valve in its closed position. In other words, the piston 30 completely seals off the high pressure fuel intake 21. On the other hand, as shown on FIG. 3, the valve is in an opening position. The high pressure fuel intake 21 is in direct communication with the low pressure fuel outlet 22.

This figure also shows several elements of the valve described earlier, namely the body 20, the piston 30 and the spring 35.

The principal innovation of the invention is the presence of means for rotating the entire body 30 and its threaded rod 32. Thus, at the time of the various translation-movements of the piston 30 in the body 20, no jamming is possible as the piston is constantly rotating.

In this described embodiment, the rotation means are mainly constituted by a vane wheel 50 placed at the end 51 of the threaded rod 32 opposite the screwed portion in the body 30. This end 51 replaces the head 33 in the preceding embodiment.

The vane wheel 50 constitutes a turbine which is activated by a pressure air intake. This intake is symbolized by a radial cavity 52 inside the body 20 around the end 51 of the rod 32 so that the vane wheel 50 is able to be completely placed opposite the latter. It is noted that a movement of translation of the entire body 30 and the threaded rod 32 also brings about a movement of translation of the vane wheel 50 with respect to this pressure air intake 52. It then follows that the vanes of this wheel 50 can be fed with air under pressure.

The placing in support of the spring is no longer effected under the head 33 of the preceding embodiment, but with the aid of a thrust ball bearing 60 placed on a small ring 54 of the rod 32.

Holes 14 are again made on the rod 32 so as to prevent the internal bore 32A from constituting a closed chamber. The motor fluid arriving via the high pressure air intake 52 is evacuated at the level of the radial chamber 53 opposite the radial chamber 52 symbolizing the air pressure inlet.

The shoulder 54 placed at the tip of the end 51 of the rod 32 makes it possible to isolate the two chambers 52 and 53. Similarly, a shoulder 56 is provided on the other side of the two cavities 52 and 53 so as to isolate them from the modulated pressure existing around the bush 27 and the threaded rod 32. An axial stop 55 may complete the threaded rod 32 in the direction of closing of the valve.

Figure 1:
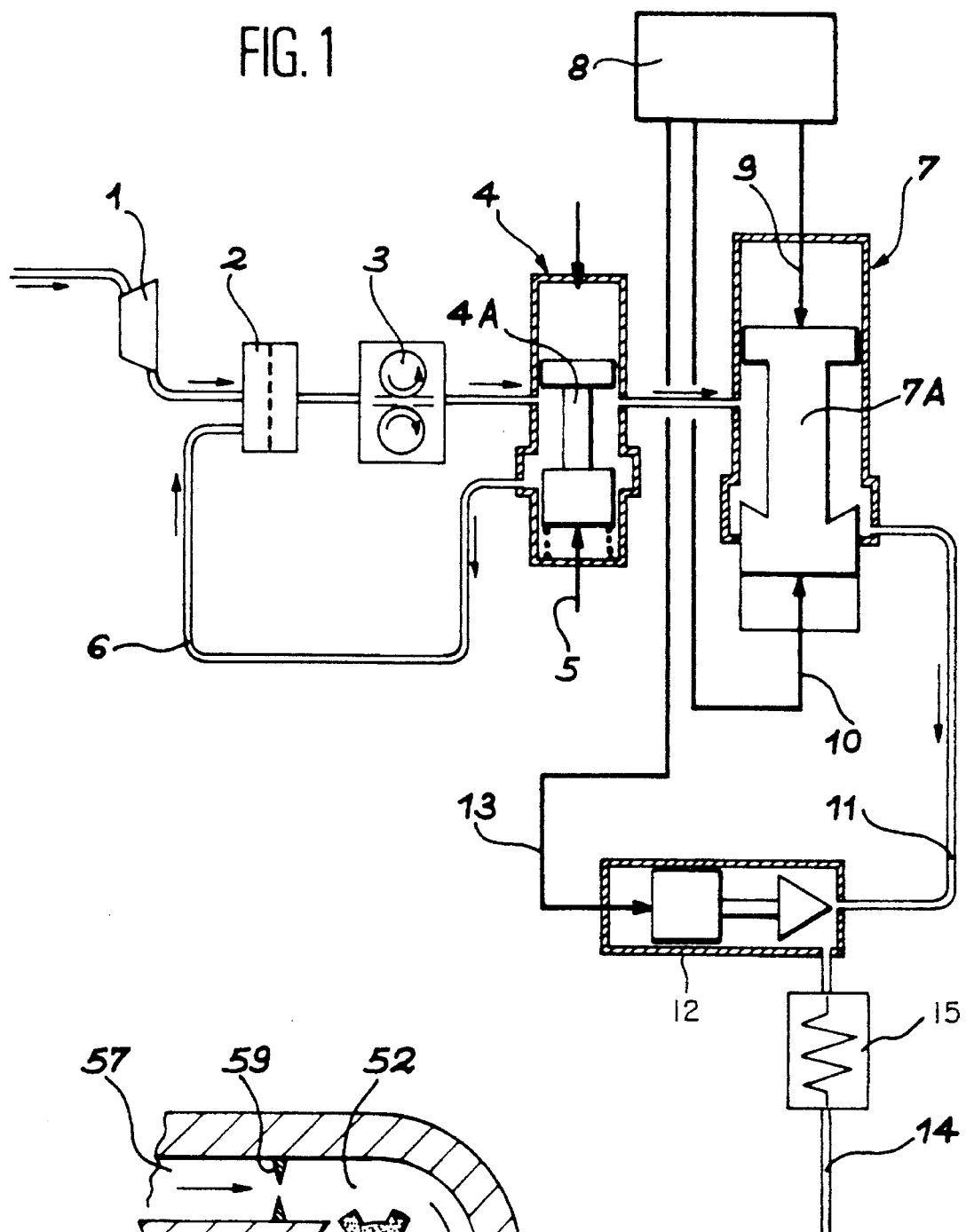
FIG. 1 shows the injection system in which the valve of the invention is used.
Figure 4:
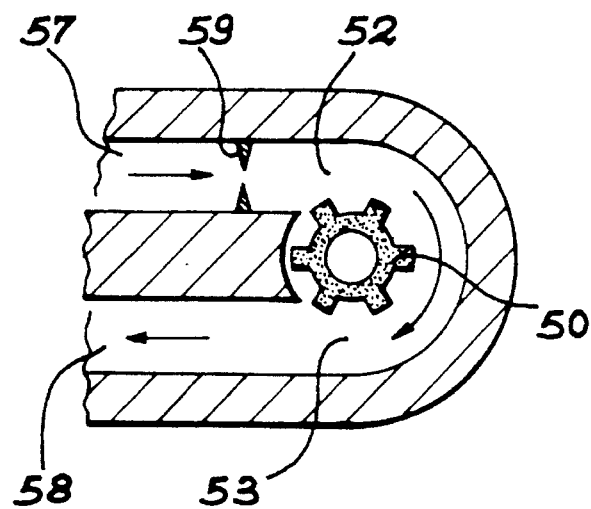
FIG. 4 is a sectional view of the details of an embodiment of the valve of the invention, as well as its diaphragm.

With reference to FIG. 4 and according to the invention, a restricted flow orifice 59 is placed in the pressure air intake pipe 57 so as to modulate the flow of air sent to the vane wheel 50 and thus its speed of rotation.

Figure 3:
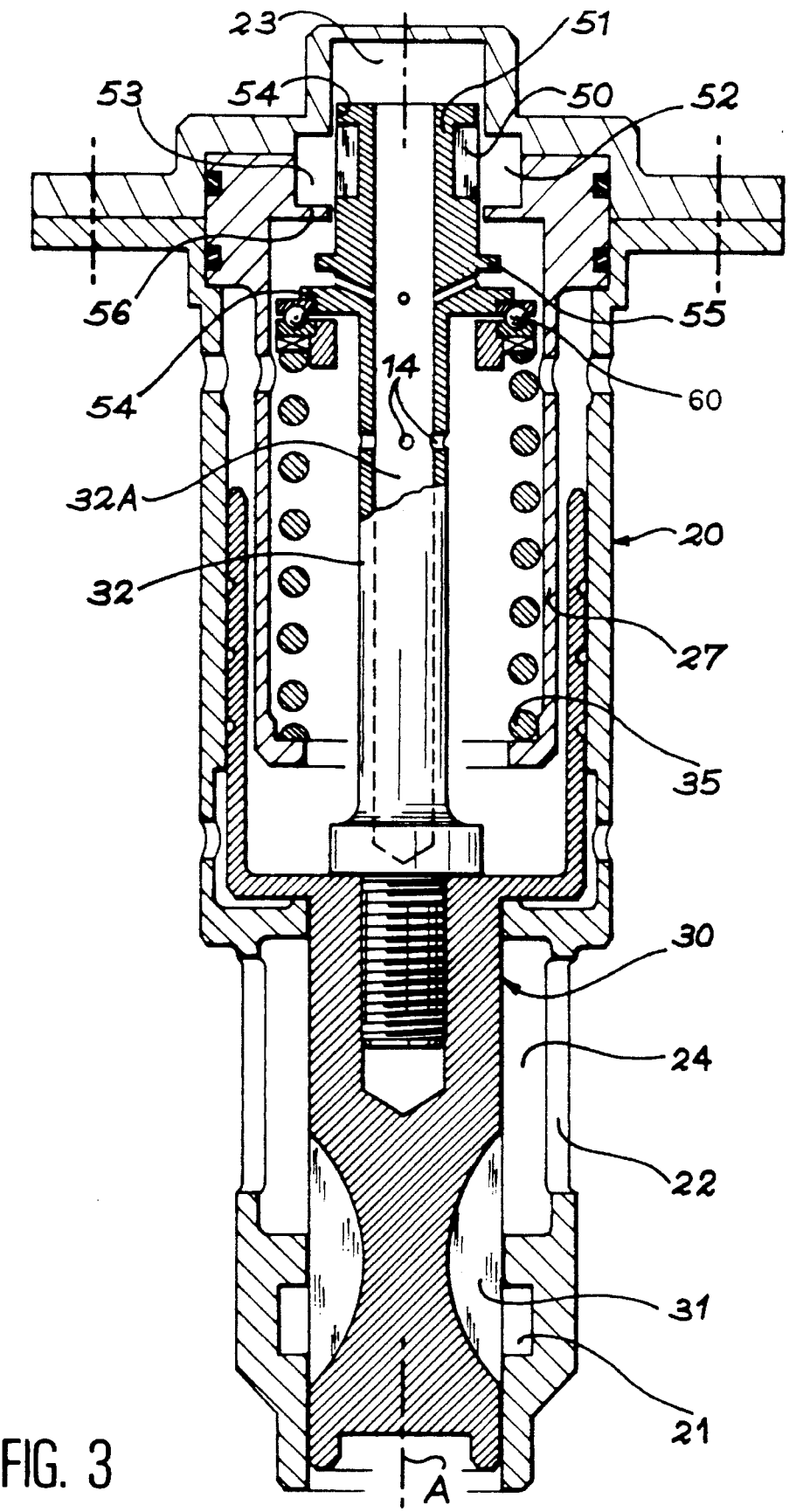
FIG. 3 is a sectional view of a valve according to the invention.

This FIG. 4 also shows an air outlet pipe 58 after said air has passed around the vane wheel 50 and the two cavities 52 and 53 shown on FIG. 3.

Thus, the jamming phenomenon of the piston 30 of the control valve is prevented from occuring.

The high pressure, which feeds it and makes the vane wheel 50 rotate varies, with the variation of the length of action of the vanes of the wheel 50 in the correct direction. In other words, when the high pressure flow is slight, the entire length of the vanes of the wheel 50 are available to the under pressure air intake. Conversely, with a strong flow of high pressure, the piston is in a position close to closing. Thus, the vanes of the wheel 50 are then partly concealed in the first cavity 23 and their effective width is thus less significant.

Accordingly, a suitable dimensioning of the vanes may therefore be appropriate for a motor torque varying within a reduced range.

What is claimed is:

1. A control valve for controlling supply of fuel to a turbo-engine, comprising:

a hollow body having at least one fuel inlet and at least one fuel outlet;

a piston having end portions, axially slidably arranged in said hollow body, said piston having at least one cavity on a circumferential surface of said piston, said inlet and outlet being arranged in such a manner that said inlet and outlet are able to be communicated via said cavity;

a member urging said piston toward a position in which said inlet and outlet do not communicate via said cavity;

a vane wheel provided at one of said end portions of said piston;

an intake provided around and facing said vane wheel, said vane wheel being driven by a pressure flow supplied in said intake; and positions and length along an axis of said piston of said vane wheel and said intake are determined in such a manner that area of said vane wheel receiving said pressure flow from said intake changes according to axial displacement of said piston.

2. A control valve according to claim 1, further comprising a restricted flow orifice provided in said pressure flow.

3. A control valve according to claim 1, wherein said cavity is in the form of lenticular apertures.

4. A control valve according to claim 1, wherein said body has a first internal cavity where said vane wheel is located, and a second internal cavity where said fuel intake, said fuel outlet and said cavity of said piston are located.

5. A control valve according to claim 1, wherein said member is a spring.

* * * * *